United States Patent
Houck et al.

(10) Patent No.: US 12,078,541 B2
(45) Date of Patent: Sep. 3, 2024

(54) OPTICAL DEVICE WITH A FOLDED OPTICAL PATH

(71) Applicant: VIAVI Solutions Inc., Chandler, AZ (US)

(72) Inventors: William D. Houck, Santa Rosa, CA (US); Steven Saxe, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/356,589

(22) Filed: Jul. 21, 2023

(65) Prior Publication Data

US 2024/0019307 A1   Jan. 18, 2024

Related U.S. Application Data

(63) Continuation of application No. 17/123,691, filed on Dec. 16, 2020, now Pat. No. 11,740,131.

(51) Int. Cl.
*G01J 3/50* (2006.01)
*G02B 5/20* (2006.01)
(Continued)

(52) U.S. Cl.
CPC .............. *G01J 3/50* (2013.01); *G02B 6/4215* (2013.01); *G02B 17/023* (2013.01); *G02B 5/20* (2013.01)

(58) Field of Classification Search
CPC .......... G01J 3/50; G01J 1/4204; G01J 3/0205; G01J 3/021; G01J 2003/1213; G01J 3/12;
(Continued)

(56) References Cited

U.S. PATENT DOCUMENTS 9,316,539 B1   4/2016   Phua
2017/0184453 A1*   6/2017   Wang ................. G01J 3/021
(Continued)

FOREIGN PATENT DOCUMENTS

DE    102018203840 A1 *  9/2019
WO    2017197013 A1    11/2017
WO    WO-2020198402 A1 * 10/2020 ............ G01J 3/0202

OTHER PUBLICATIONS

English Translation of Baumgart et al DE102018203840A1 Description (Year: 2019).*
(Continued)

*Primary Examiner* — Tarifur R Chowdhury
*Assistant Examiner* — Akbar H. Rizvi
(74) *Attorney, Agent, or Firm* — Harrity & Harrity, LLP

(57) ABSTRACT

In some implementations, an optical device may include an aperture, one or more optical elements, an optical filter, and an optical sensor. The aperture may be configured to receive light. The one or more optical elements may be configured to diffuse the light received by the aperture, direct the diffused light to the optical filter via a folded optical path, wherein a length of the folded optical path is greater than a distance between the aperture and an input surface of the optical filter, and cause the diffused light to be distributed across the input surface of the optical filter. The optical filter may be configured to filter the diffused light distributed across the input surface of the optical filter to pass portions of the diffused light associated with one or more wavelengths to the optical sensor.

20 Claims, 6 Drawing Sheets

(51) Int. Cl.
*G02B 6/42* (2006.01)
*G02B 17/02* (2006.01)

(58) Field of Classification Search
CPC ........ G01J 3/0256; G01J 3/26; G02B 6/4215; G02B 17/023; G02B 5/20; G02B 19/0019; G02B 5/0278; G02B 19/0076; G02B 27/0081; G02B 6/0096; H05K 999/99; G01D 5/26
See application file for complete search history.

(56) References Cited

U.S. PATENT DOCUMENTS

| | | |
|---|---|---|
| 2019/0186991 A1 | 6/2019 | Kovach et al. |
| 2019/0339128 A1 | 11/2019 | Knobbe et al. |
| 2019/0353522 A1* | 11/2019 | Scholtz ................ G01J 3/0259 |
| 2022/0187130 A1 | 6/2022 | Houck et al. |

OTHER PUBLICATIONS

Extended European Search Report for Application No. EP21199557, mailed on May 2, 2022, 8 pages.

Monakhova K et al., "Spectral Diffusercam: Lensless Snapshot Hyperspectral Imaging With a Spectral Filter Array," Optica, Jun. 2020, vol. X(X), Apr. 2016, 10 pages.

* cited by examiner

OPTICAL DEVICE WITH A FOLDED OPTICAL PATH

RELATED APPLICATION

This application is a continuation of U.S. patent application Ser. No. 17/123,691, filed Dec. 16, 2020, which is incorporated herein by reference in its entirety.

BACKGROUND

An optical device may be utilized to capture information. For example, the optical device may capture information relating to a set of electromagnetic frequencies. The optical device may include a set of sensor elements (e.g., optical sensors, spectral sensors, and/or image sensors) that capture the information. For example, an array of sensor elements may be utilized to capture information relating to multiple frequencies. The sensor element array may be associated with an optical filter. The optical filter may include one or more channels that respectively pass particular frequencies to sensor elements of the sensor element array.

SUMMARY

In some implementations, an optical device includes an aperture; one or more optical elements; an optical filter; and an optical sensor, wherein: the aperture is configured to receive light; the one or more optical elements are configured to: diffuse the light received by the aperture, direct the diffused light to the optical filter via a folded optical path, wherein a length of the folded optical path is greater than a distance between the aperture and an input surface of the optical filter, and cause the diffused light to be distributed across the input surface of the optical filter; and the optical filter is configured to filter the diffused light distributed across the input surface of the optical filter to pass portions of the diffused light associated with one or more wavelengths to the optical sensor.

In some implementations, an optical system includes an aperture; one or more optical elements; an optical filter; and an optical sensor, wherein: the aperture is configured to receive light; and the one or more optical elements are configured to: diffuse the light received by the aperture, cause the diffused light to transmit to the optical filter via a folded optical path and to be distributed across an input surface of the optical filter, wherein a length of the folded optical path is greater than a distance between the aperture and the input surface of the optical filter.

In some implementations, a user device includes an optical package, comprising: an aperture; one or more optical elements; an optical filter; and an optical sensor, wherein: the one or more optical elements are configured to diffuse light received by the aperture and cause the diffused light to transmit to the optical filter via a folded optical path and to be distributed across an input surface of the optical filter, wherein a length of the folded optical path is greater than a distance between the aperture and the input surface of the optical filter.

DETAILED DESCRIPTION

Figure 1:
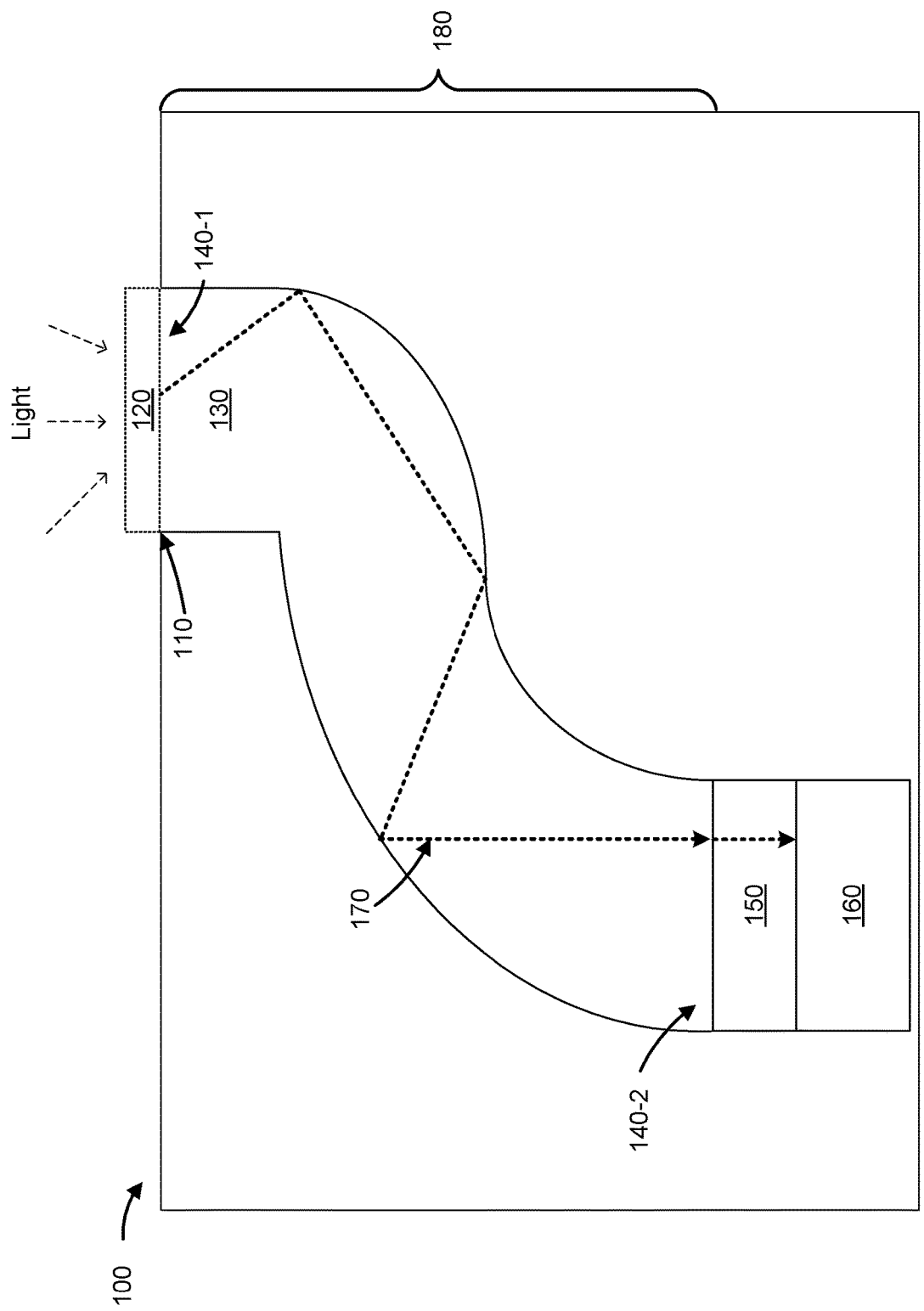
FIG. 1 is a diagram illustrating a side-view of an example optical device described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

An optical device, such as a spectrometer, may be configured to determine spectral information associated with light (e.g., ambient light) captured by the optical device. The light may enter the optical device and may be received by an optical filter and an optical sensor of the optical device (e.g., wherein the optical filter is disposed on the optical sensor). The optical filter may include a set of optical channels designed to respectively pass light in different wavelength ranges to a set of sensors elements of the optical sensor. This allows the optical sensor to determine spectral information associated with the light that relates to the different wavelength ranges.

Often, the light enters the optical device and falls incident on only a portion of an input surface of the optical filter. Consequently, only optical channels associated with the portion of the input surface of the optical filter pass light (if any) to corresponding optical sensors of the optical sensor. This inhibits the optical sensor's ability to determine accurate spectral information associated with the light.

In some cases, the optical device may utilize a conventional linear optical path configuration, where the optical device includes an optical diffuser to diffuse the light that enters the optical device. This causes the light to disperse as the light transmits along a linear optical path (e.g., a linear path from an opening of the optical device to the optical filter), which causes the light to distribute across the input surface of the optical filter (and thereby allow distribution of a point spread function of the light across the optical sensor). However, the optical path needs to have a sufficiently long length (e.g., on the order of centimeters) to allow the light to disperse and to fully distribute across the input surface of the optical filter. Consequently, a conventional linear optical path configuration requires an optical device thickness (e.g., on the order of centimeters) that prevents the optical device from being incorporated into user devices, such as mobile phone devices, that require a smaller form factor (e.g., a thickness on the order of millimeters).

Moreover, the optical diffuser causes some light beams of the light to fall incident on the input surface of the optical filter at extreme angles. This causes the light beams to enter the optical filter such that a channel of the optical filter that receives an individual light beam (e.g., that is associated with a wavelength that the channel is configured to pass) does not pass the light beam to a corresponding sensor element of the optical sensor, but rather, to a different sensor element of the optical sensor. This further inhibits the optical sensor's ability to determine accurate spectral information associated with the light.

Some implementations described herein provide an optical device that includes an aperture, one or more optical elements, an optical filter, and an optical sensor. The aperture may be configured to receive light (e.g., ambient light). In some implementations, the one or more optical elements may be configured to diffuse the light received by the aperture. For example, a diffusive optical element may diffuse the light. In some implementations, the one or more optical elements may direct the diffused light to the optical filter via a folded optical path (an optical path that changes a heading of a light beam of the diffused light one or more times before the light beam reaches the optical filter). For example, the one or more optical elements may include at least one optical conduit, reflective optical element, transmissive optical element, diffractive optical element, and/or refractive optical element to direct the diffused light to the optical filter via the folded optical path. Accordingly, in some implementations, the one or more elements provide a folded optical path with a sufficiently long length to cause the diffused light to be distributed across an input surface of the optical filter (e.g., to cause the diffused light to cover at least a particular percentage of the input surface of the optical filter, such as 50%, 70%, 95%, 98%, or 99.5% of the optical filter).

In this way, the optical device increases the optical sensor's ability to determine accurate spectral information associated with light that enters the optical device as opposed to an optical device that does not diffuse light. Further, in some implementations, a length of the folded optical path provided by the one or more optical elements is greater than a distance between the aperture and an input surface of the optical filter, which allows the optical device to have a reduced thickness as compared to an optical device that uses a conventional linear optical path configuration. This allows the optical device to be incorporated into user devices, such as mobile phone devices, that require a small form factor (e.g., a thickness on the order of millimeters), which is not possible for optical devices that use a conventional linear optical path configuration.

In some implementations, the one or more optical elements of the optical device may be configured to cause light beams of the diffused light to fall incident on the input surface of the optical filter at angles that satisfy (e.g., that are less than or equal to) an incidence angle threshold. This causes the light beams to enter the optical filter such that a channel of the optical filter that receives an individual light beam (e.g., that is associated with a wavelength that the channel is configured to pass) passes the light beam to a corresponding sensor element of the optical sensor. This increases a likelihood that the optical sensor may determine accurate spectral information associated with the diffused light as compared to an optical sensor included in an optical device that utilizes a conventional linear optical path configuration.

FIG. 1 is a diagram illustrating a side-view of an example optical device 100 (also referred to as an optical system). The example optical device 100 may be configured to collect light to facilitate analysis of the light (e.g., to determine spectral information associated with the light). As shown in FIG. 1, example optical device 100 may include an aperture 110, a diffusive optical element 120, an optical conduit 130 with a first end 140-1 of the optical conduit 130 and a second end 140-2 of the optical conduit 130, an optical filter 150, and/or an optical sensor 160. The aperture 110 may include a lens, a window, or any other type of transmissive optical element that receives light into the example optical device 100. The aperture 110 may include an aperture stop, or one or more other optical elements, to control an amount of light that enters the example optical device 100 and/or to control a range of incidence angles of the light that enters the example optical device 100 via the aperture 110.

The diffusive optical element 120 may include an optical diffuser and/or any other type of optical structure to diffuse light. The diffusive optical element 120 may be disposed over the aperture 110. For example, as shown in FIG. 1, the diffusive optical element 120 may be positioned on an exterior surface of the example optical device 100 to cause light to transmit through the diffusive optical element 120 before entering the example optical device 100 via the aperture 110. Other configurations are contemplated. For example, the diffusive optical element 120 may be positioned on an interior surface of the example optical device 100 to cause light to enter the example optical device 100 via the aperture 110 and then transmit through the diffusive optical element 120. Accordingly, the diffusive optical element 120 may diffuse the light received by the aperture 110 to create diffused light.

The optical conduit 130 may include a light guide, a light pipe, and/or any other type of optical structure to transmit light. In some implementations, the optical conduit 130 may be configured to receive and to transmit the diffused light created by the diffusive optical element 120 to the optical filter 150. For example, as shown in FIG. 1, the optical conduit 130 may be disposed between the aperture 110 and the optical filter 150. The first end 140-1 of the optical conduit 130 may be disposed on the diffusive optical element 120 (e.g., attached and/or mounted to the diffusive optical element 120, close to the diffusive optical element 120 to allow the first end 140-1 of the optical conduit 130 to receive the diffused light, and/or the like). The second end 140-2 of the optical conduit 130 may be disposed on the optical filter 150 (e.g., attached and/or mounted to the optical filter 150, close to the optical filter 150 to allow the second end 140-2 of the optical conduit 130 to direct the diffused light to the optical filter 150, and/or the like). In some implementations, when the example optical device 100 does not include the diffusive optical element 120, the optical conduit 130 may be configured to diffuse the light received by the aperture 110 and to transmit the diffused light to the optical filter 150.

The optical conduit 130 may include one or more portions (e.g., one or more interior surfaces, one or more optical structures, and/or the like) that are configured to direct the diffused light to the optical filter 150. For example, the one or more portions may be configured to reflect, refract, diffract, and/or transmit, among other examples, the diffused light to cause the diffused light to transmit to the optical filter 150. In some implementations, when the example optical device 100 includes the diffusive optical element 120, the optical conduit 130 may include one or more additional portions that are configured to further diffuse the diffused light received from the diffusive optical element 120. In some implementations, when the example optical device 100 does not include the diffusive optical element 120, the one or more additional portions may be configured to diffuse the light received by the aperture 110.

The optical filter 150 may include a spectral filter, a multispectral filter, an optical interference filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, and/or glasses, among other examples), and/or the like. The optical filter 150 may pass one or more wavelengths of the diffused light for sensing by the optical sensor 160. For example, the optical filter 150 may comprise one or more channels (also referred to as a filter array), where each channel is configured to pass light associated with a wavelength. In some implementations, the optical filter 150 may include multiple, different filters that are configured to pass respective spectral ranges to the optical sensor 160.

The optical sensor 160 may include a device capable of performing a measurement of light directed toward the optical sensor 160 (e.g., the one or more wavelengths of the diffused light passed by the optical filter 150), such as a spectral sensor or a multi-spectral sensor. The optical sensor 160 may be, for example, a silicon (Si) based sensor, an indium-gallium-arsenide (InGaAs) based sensor, a lead-sulfide (PbS) based sensor, or a germanium (Ge) based sensor, may utilize one or more sensor technologies, such as a complementary metal-oxide-semiconductor (CMOS) technology, or a charge-coupled device (CCD) technology, among other examples. In some implementations, the optical sensor 160 may include multiple sensor elements (e.g., an array of sensor elements, also referred to herein as a sensor array), each configured to obtain information. For example, a sensor element may provide an indication of intensity of light that is incident on the sensor element (e.g., active/inactive or a more granular indication of intensity). In this way, the optical sensor 160 may be configured to capture spectral information associated with the diffused light that is directed to the optical filter 150 by the optical conduit 130. While some implementations described herein are directed to the optical sensor 160 being configured to capture spectral information, other implementations are also contemplated. For example, the optical sensor 160 may be configured to capture imaging information, such as hyper-spectral imaging information, multispectral imaging information, and/or the like.

In some implementations, light (e.g., ambient light) may be diffused by the diffusive optical element 120 to create diffused light, which may enter the example optical device 100 via the aperture 110. The diffused light then may enter the first end 140-1 of the optical conduit 130. As shown in FIG. 1, the optical conduit 130 may direct a light beam of the diffused light to the optical filter 150 via a folded optical path 170 (e.g., an optical path that changes a heading of the light beam one or more or more times before the light beam reaches the optical filter 150). The folded optical path may traverse an internal region of the optical conduit 130. For example, the folded optical path 170 is shown in FIG. 1 as traversing the internal region of the optical conduit 130 from an origination point associated with an output surface of the diffusive optical element 120 and/or the first end 140-1 of the optical conduit 130 to a termination point associated with the second end 140-2 of the optical conduit 130 and/or the input surface of the optical filter 150.

In this way, the folded optical path 170 is long enough to allow the diffused light to disperse while transmitting through the optical conduit 130. This causes the diffused light to be distributed across the input surface of the optical filter 150 (e.g., causes the diffused light to cover at least a particular percentage of the input surface of the optical filter 150, such as 95%, 98%, or 99.5% of the input surface of the optical filter 150), which may allow the optical filter 150 to pass more of the diffused light to the optical sensor 160 than using conventional configurations that do not utilize a folded optical path. Further, in some implementations, a length of the folded optical path 170 is greater than a distance 180 between the aperture 110 and an input surface of the optical filter 150, which allows the optical device 100 to have a reduced thickness as compared to using conventional configurations that do not utilize a folded optical path. For example, the length of the folded optical path 170 may be approximately 10 mm and the distance 180 may be approximately 3-5 mm. This allows the optical device 100 to be incorporated into user devices, such as mobile phone devices, that require a small form factor (e.g., a thickness on the order of millimeters), which is not otherwise possible.

Moreover, the optical conduit 130 may be configured to cause light beams of the diffused light to fall incident on the input surface of the optical filter 150 at angles that satisfy (e.g., that are less than or equal to) an incidence angle threshold. This causes the light beams to enter the optical filter 150 such that a channel of the optical filter 150 that receives an individual light beam (e.g., that is associated with a wavelength that the channel is configured to pass) passes the light beam to a corresponding sensor element of the optical sensor 160 (rather than a sensor element that does not correspond to the channel). This increases a likelihood that the optical sensor 160 determines accurate spectral information associated with the diffused light as compared to an optical sensor included in an optical device that utilizes a conventional configuration.

As indicated above, FIG. 1 is provided as an example. Other examples may differ from what is described with regard to FIG. 1.

Figure 2:
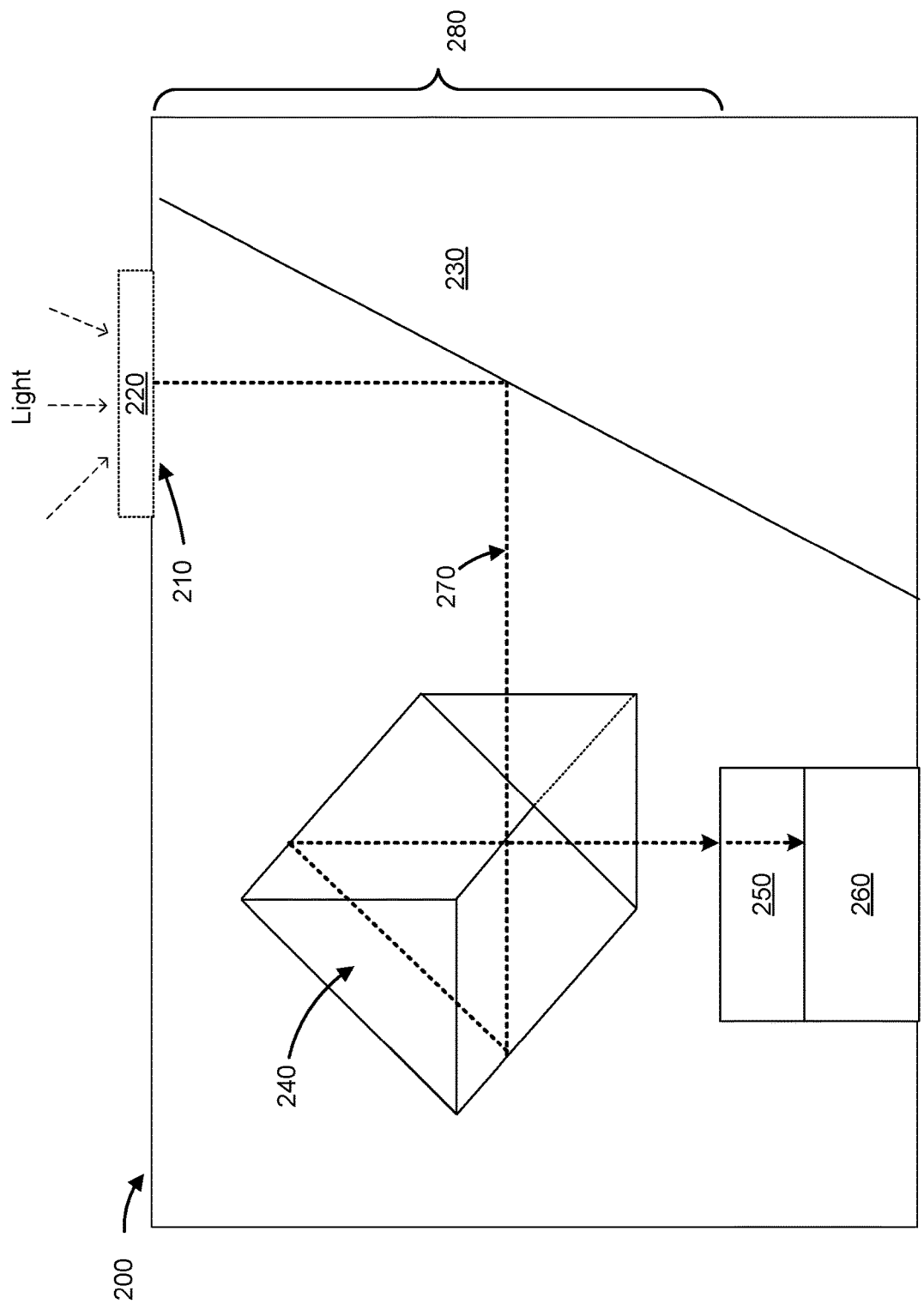
FIG. 2 is a diagram illustrating a side-view of an example optical device described herein.

FIG. 2 is a diagram illustrating a side-view of an example optical device 200 (also referred to as an optical system). The example optical device 200 may be configured to collect light to facilitate analysis of the light (e.g., to determine spectral information associated with the light). As shown in FIG. 2, example optical device 200 may include an aperture 210, a diffusive optical element 220, a reflective optical element 230, a prism 240, an optical filter 250, and/or an optical sensor 260. The aperture 210, the diffusive optical element 220, the optical filter 250, and the optical sensor 260 may respectively be the same as, or similar to, the aperture 110, the diffusive optical element 120, the optical filter 150, and the optical sensor 160 described herein in relation to FIG. 1. Accordingly, the diffusive optical element 220 may diffuse light received by the aperture 210 to create diffused light, and the optical sensor 260 may be configured to capture spectral information associated with the diffused light that is directed to the optical filter 250 by the reflective optical element 230 and/or the prism 240.

The reflective optical element 230 may include an optical reflector and/or any other type of optical structure to reflect light. The reflective optical element 230 may be positioned within an internal region of the example optical device 200 to receive the diffused light from the diffusive optical element 220 and to reflect the diffused light to the prism 240. In some implementations, the reflective optical element 230 may be configured to reflect one or more particular ranges of wavelengths of the diffused light to the prism 240. For example, the reflective optical element 230 may be partially transmissive and/or partially absorbing for wavelengths of the diffused light that are not within the one or more particular ranges to prevent the reflective optical element 230 from reflecting diffused light not associated with the one or more particular ranges to the prism 240. The prism 240 may include an imaging prism, such as a pentaprism, and/or any other type of optical structure to, for example, reflect, refract, polarize, and/or deflect light. The prism 240 may be positioned within the internal region of the example optical device 200 to receive the diffused light from the reflective optical element 230 (e.g. after the reflective optical element 230 reflects the diffused light) and to direct the diffused light to the optical filter 250.

In some implementations, light (e.g., ambient light) may be diffused by the diffusive optical element 220 to create diffused light, which may enter the example optical device 200 via the aperture 210. As shown in FIG. 2, the reflective optical element 230 and the prism 240 may direct a light beam of the diffused light to an input surface of the optical filter 250 via a folded optical path 270 that originates at an output surface of the diffusive optical element 220 and terminates at the input surface of the optical filter 250 and that traverses an internal region of the example optical device 200. For example, the light beam may transmit from the output surface of the diffusive optical element 220 to the reflective optical element 230, which may reflect the light beam to the prism 240. The prism 240 may internally reflect the light beam one or more times (e.g., two times as shown in FIG. 2) to cause the light beam to transmit to the input surface of the optical filter 250.

In this way, the folded optical path 270 is long enough to allow the diffused light to disperse while transmitting through the internal region of the example optical device 200. This causes the diffused light to be distributed across the input surface of the optical filter 250 (e.g., causes the diffused light to cover at least a particular percentage of the input surface of the optical filter 250, such as 95%, 98%, or 99.5% of the input surface of the optical filter 250), which may allow the optical filter 250 to pass more of the diffused light to the optical sensor 260 than using conventional configurations that do not utilize a folded optical path. Further, in some implementations, a length of the folded optical path 270 is greater than a distance 280 between the aperture 210 and an input surface of the optical filter 250, which allows the optical device 200 to have a reduced thickness as compared to using conventional configurations that do not utilize a folded optical path. For example, the length of the folded optical path 270 may be approximately 10 mm and the distance 280 may be approximately 3-5 mm. This allows the optical device 200 to be incorporated into user devices, such as mobile phone devices, that require a small form factor (e.g., a thickness on the order of millimeters), which is not otherwise possible.

Moreover, the reflective optical element 230 and the prism 240 may be configured to cause light beams of the diffused light to fall incident on the input surface of the optical filter 250 at angles that satisfy (e.g., that are less than or equal to) an incidence angle threshold. This causes the light beams to enter the optical filter 250 such that a channel of the optical filter 250 that receives an individual light beam (e.g., that is associated with a wavelength that the channel is configured to pass) passes the light beam to a corresponding sensor element of the optical sensor 260 (rather than a sensor element that does not correspond to the channel). This increases a likelihood that the optical sensor 260 determines accurate spectral information associated with the diffused light as compared to an optical sensor included in an optical device that utilizes a conventional configuration.

As indicated above, FIG. 2 is provided as an example. Other examples may differ from what is described with regard to FIG. 2.

Figure 3:
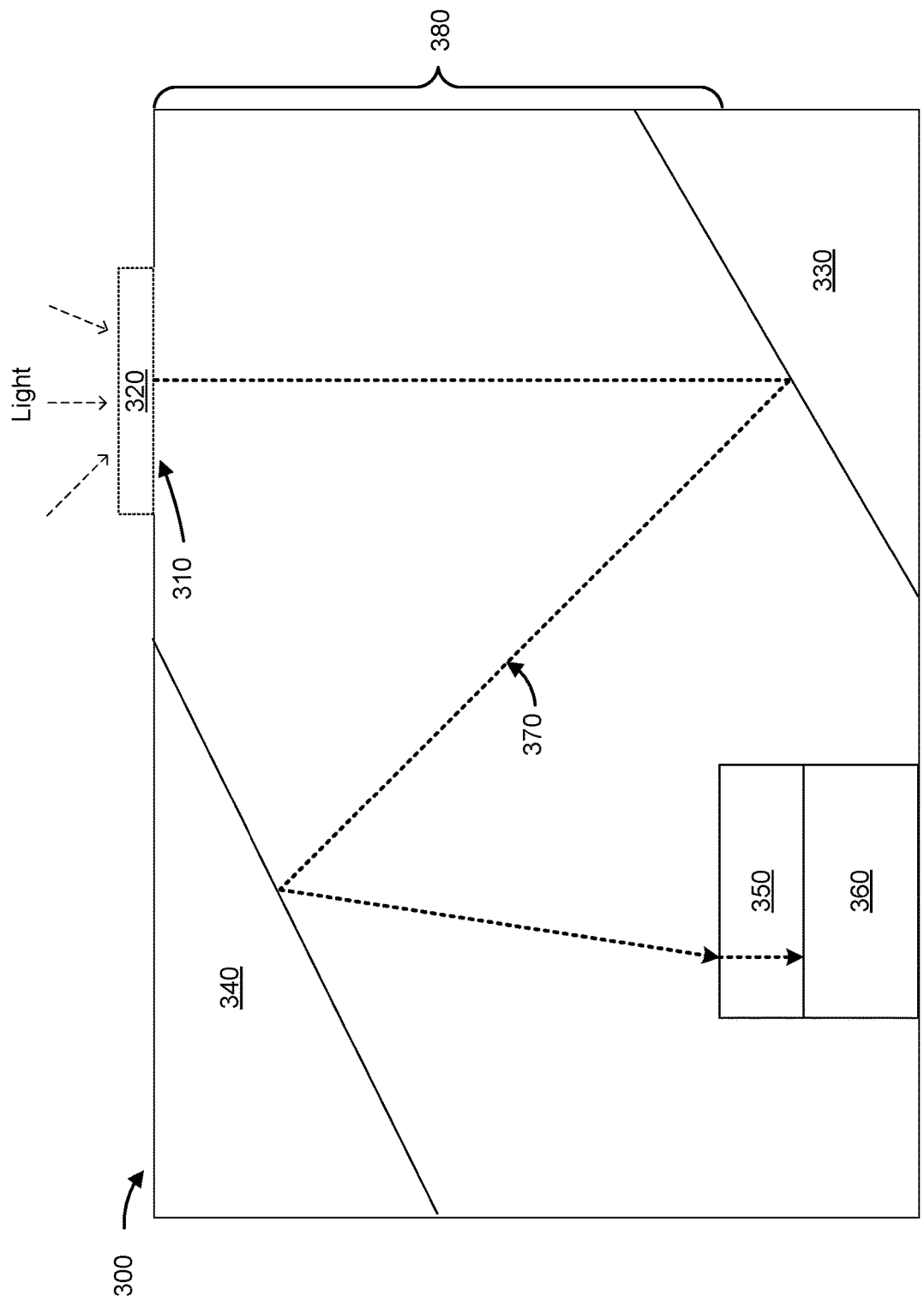
FIG. 3 is a diagram illustrating a side-view of an example optical device described herein.

FIG. 3 is a diagram illustrating a side-view of an example optical device 300 (also referred to as an optical system). The example optical device 300 may be configured to collect light to facilitate analysis of the light (e.g., to determine spectral information associated with the light). As shown in FIG. 3, example optical device 300 may include an aperture 310, a diffusive optical element 320, a reflective optical element 330, a reflective optical element 340, an optical filter 350, and/or an optical sensor 360. The aperture 310, the diffusive optical element 320, the optical filter 350, and the optical sensor 360 may respectively be the same as, or similar to, the aperture 110, the diffusive optical element 120, the optical filter 150, and the optical sensor 160 described herein in relation to FIG. 1. Accordingly, the diffusive optical element 320 may diffuse light received by the aperture 310 to create diffused light, and the optical sensor 360 may be configured to capture spectral information associated with the diffused light that is directed to the input surface of the optical filter 350 by the reflective optical element 330 and/or the reflective optical element 340.

The reflective optical element 330 may include an optical reflector and/or any other type of optical structure to reflect light. The reflective optical element 330 may be positioned within an internal region of the example optical device 300 to receive the diffused light from the diffusive optical element 320 and to reflect the diffused light to the reflective optical element 340. In some implementations, the reflective optical element 330 may be configured to reflect one or more first ranges of wavelengths of the diffused light to the reflective optical element 340. For example, the reflective optical element 330 may be partially transmissive and/or partially absorbing for wavelengths of the diffused light that are not within the one or more first ranges to prevent the reflective optical element 330 from reflecting diffused light not associated with the one or more first ranges to the reflective optical element 340.

The reflective optical element 340 may include an optical reflector and/or any other type of optical structure to reflect light. The reflective optical element 340 may be positioned within an internal region of the example optical device 300 to receive the diffused light from the reflective optical element 330 (e.g. after the reflective optical element 330 reflects the diffused light) and to reflect the diffused light to the optical filter 350. In some implementations, the reflective optical element 340 may be configured to reflect one or more second ranges of wavelengths of the diffused light (e.g., where the one or more second ranges of wavelengths of the diffused light are the same as or different from the one or more first ranges of wavelengths of the diffused light) to the optical filter 350. For example, the reflective optical element 340 may be partially transmissive and/or partially absorbing for wavelengths of the diffused light that are not within the one or more second ranges to prevent the reflective optical element 340 from reflecting diffused light not associated with the one or more particular ranges to the optical filter 350.

In some implementations, light (e.g., ambient light) may be diffused by the diffusive optical element 320 to create diffused light, which may enter the example optical device 300 via the aperture 310. As shown in FIG. 3, the reflective optical element 330 and the reflective optical element 340 may direct a light beam of the diffused light to an input surface of the optical filter 350 via a folded optical path 370 that originates at an output surface of the diffusive optical element 320 and terminates at the input surface of the optical filter 350 and that traverses an internal region of the example optical device 300. For example, the light beam may transmit from the diffusive optical element 320 to the reflective optical element 330, which may reflect the light beam to the reflective optical element 340, which may reflect the light beam to the input surface of the optical filter 350.

In this way, the folded optical path 370 is long enough to allow the diffused light to disperse while transmitting through the internal region of the example optical device 300. This causes the diffused light to be distributed across the input surface of the optical filter 350 (e.g., causes the diffused light to cover at least a particular percentage of the input surface of the optical filter 350, such as 95%, 98%, or 99.5% of the input surface of the optical filter 350), which may allow the optical filter 350 to pass more of the diffused light to the optical sensor 360 than using conventional configurations that do not utilize a folded optical path. Further, in some implementations, a length of the folded optical path 370 is greater than a distance 380 between the aperture 310 and an input surface of the optical filter 350, which allows the optical device 300 to have a reduced thickness as compared to using conventional configurations that do not utilize a folded optical path. For example, the length of the folded optical path 370 may be approximately 10 mm and the distance 380 may be approximately 3-5 mm. This allows the optical device 300 to be incorporated into user devices, such as mobile phone devices, that require a small form factor (e.g., a thickness on the order of millimeters), which is not otherwise possible.

Moreover, the reflective optical element 330 and the reflective optical element 340 may be configured to cause light beams of the diffused light to fall incident on the input surface of the optical filter 350 at angles that satisfy (e.g., that are less than or equal to) an incidence angle threshold. This causes the light beams to enter the optical filter 350 such that a channel of the optical filter 350 that receives an individual light beam (e.g., that is associated with a wavelength that the channel is configured to pass) passes the light beam to a corresponding sensor element of the optical sensor 360 (rather than a sensor element that does not correspond to the channel). This increases a likelihood that the optical sensor 360 determines accurate spectral information associated with the diffused light as compared to an optical sensor included in an optical device that utilizes a conventional configuration.

As indicated above, FIG. 3 is provided as an example. Other examples may differ from what is described with regard to FIG. 3.

Figure 4:
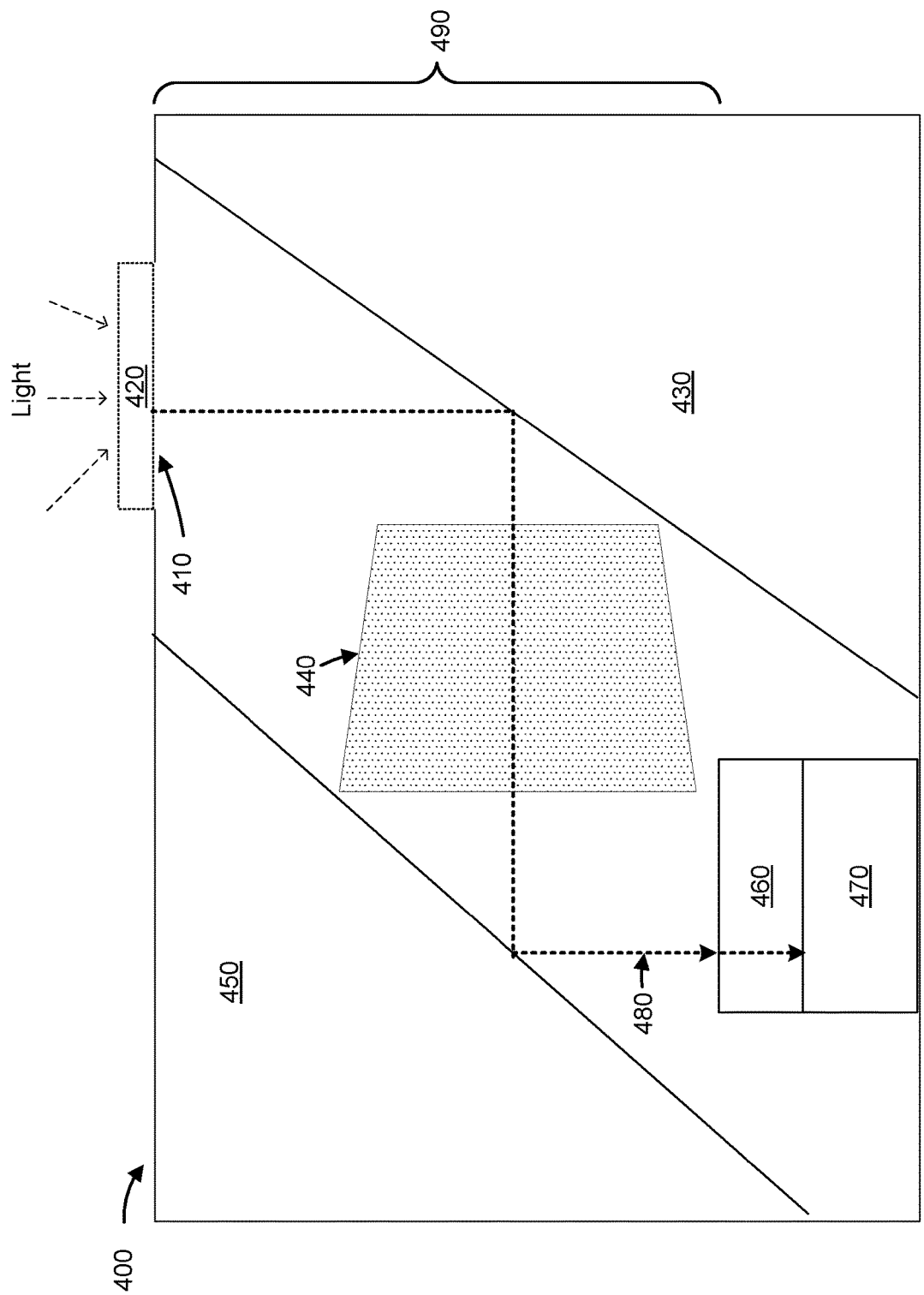
FIG. 4 is a diagram illustrating a side-view of an example optical device described herein.

FIG. 4 is a diagram illustrating a side-view of an example optical device 400 (also referred to as an optical system). The example optical device 400 may be configured to collect light to facilitate analysis of the light (e.g., to determine spectral information associated with the light). As shown in FIG. 4, example optical device 400 may include an aperture 410, a diffusive optical element 420, a reflective optical element 430, an optical conduit 440, a reflective optical element 450, an optical filter 460, and/or an optical sensor 470. The aperture 410, the diffusive optical element 420, the optical filter 460, and the optical sensor 470 may respectively be the same as, or similar to, the aperture 110, the diffusive optical element 120, the optical filter 150, and the optical sensor 160 described herein in relation to FIG. 1. Accordingly, the diffusive optical element 420 may diffuse light received by the aperture 410 to create diffused light, and the optical sensor 470 may be configured to capture spectral information associated with the diffused light that is directed to the input surface of the optical filter 460 by the reflective optical element 430, the optical conduit 440, and/or the reflective optical element 450.

The reflective optical element 430 may include an optical reflector and/or any other type of optical structure to reflect light. The reflective optical element 430 may be positioned within an internal region of the example optical device 400 to receive the diffused light from the diffusive optical element 420 and to reflect the diffused light to the optical conduit 440. In some implementations, the reflective optical element 430 may be configured to reflect one or more first ranges of wavelengths of the diffused light to the optical conduit 440. For example, the reflective optical element 430 may be partially transmissive and/or partially absorbing for wavelengths of the diffused light that are not within the one or more first ranges to prevent the reflective optical element 430 from reflecting diffused light not associated with the one or more first ranges to the optical conduit 440.

The optical conduit 440 may include a light guide, a light pipe, and/or any other type of optical structure to transmit light. In some implementations, the optical conduit 440 may be positioned within an internal region of the example optical device 400 to receive the diffused light reflected by the reflective optical element 430 and to transmit the diffused light to the reflective optical element 450. The optical conduit 440 may include one or more portions (e.g., one or more interior surfaces, one or more optical structures, and/or the like) that are configured to direct the diffused light to the reflective optical element 450. For example, the one or more portions may be configured to reflect, refract, diffract, and/or transmit, among other examples, the diffused light to cause the diffused light to transmit to the reflective optical element 450. In some implementations, the optical conduit 440 may include one or more additional portions that are configured to further diffuse the diffused light received from the reflective optical element 430.

The reflective optical element 450 may include an optical reflector and/or any other type of optical structure to reflect light. The reflective optical element 450 may be positioned within an internal region of the example optical device 400 to receive the diffused light from the optical conduit 440 and to reflect the diffused light to the optical filter 460. In some implementations, the reflective optical element 450 may be configured to reflect one or more second ranges of wavelengths of the diffused light (e.g., where the one or more second ranges of wavelengths of the diffused light are the same as or different from the one or more first ranges of wavelengths of the diffused light) to the optical filter 460. For example, the reflective optical element 450 may be partially transmissive and/or partially absorbing for wavelengths of the diffused light that are not within the one or more second ranges to prevent the reflective optical element 450 from reflecting diffused light not associated with the one or more particular ranges to the optical filter 460.

In some implementations, light (e.g., ambient light) may be diffused by the diffusive optical element 420 to create diffused light, which may enter the example optical device 400 via the aperture 410. As shown in FIG. 4, the reflective optical element 430, the optical conduit 440, and the reflective optical element 450 may direct a light beam of the diffused light to an input surface of the optical filter 460 via a folded optical path 480 that originates at an output surface of the diffusive optical element 420 and terminates at the input surface of the optical filter 460 and that traverses an internal region of the example optical device 400 and an internal region of the optical conduit 440. For example, the light beam may transmit from the diffusive optical element 420 to the reflective optical element 430, which may reflect the light beam to the optical conduit 440, which may transmit the light beam to the reflective optical element 450, which may reflect the light beam to the input surface of the optical filter 460.

In this way, the folded optical path 480 is long enough to allow the diffused light to disperse while transmitting through the internal region of the example optical device 400. This causes the diffused light to be distributed across the input surface of the optical filter 460 (e.g., causes the diffused light to cover at least a particular percentage of the input surface of the optical filter 460, such as 95%, 98%, or 99.5% of the input surface of the optical filter 460), which may allow the optical filter 460 to pass more of the diffused light to the optical sensor 470 than using conventional configurations that do not utilize a folded optical path. Further, in some implementations, a length of the folded optical path 480 is greater than a distance 490 between the aperture 410 and an input surface of the optical filter 460, which allows the optical device 400 to have a reduced thickness as compared to using conventional configurations that do not utilize a folded optical path. For example, the length of the folded optical path 480 may be approximately 10 mm and the distance 490 may be approximately 3-5 mm. This allows the optical device 400 to be incorporated into user devices, such as mobile phone devices, that require a small form factor (e.g., a thickness on the order of millimeters), which is not otherwise possible.

Moreover, the reflective optical element 430, the optical conduit 440, and the reflective optical element 450 may be configured to cause light beams of the diffused light to fall incident on the input surface of the optical filter 460 at angles that satisfy (e.g., that are less than or equal to) an incidence angle threshold. This causes the light beams to enter the optical filter 460 such that a channel of the optical filter 460 that receives an individual light beam (e.g., that is associated with a wavelength that the channel is configured to pass) passes the light beam to a corresponding sensor element of the optical sensor 470 (rather than a sensor element that does not correspond to the channel). This increases a likelihood that the optical sensor 470 determines accurate spectral information associated with the diffused light as compared to an optical sensor included in an optical device that utilizes a conventional configuration.

As indicated above, FIG. 4 is provided as an example. Other examples may differ from what is described with regard to FIG. 4.

Figure 5:
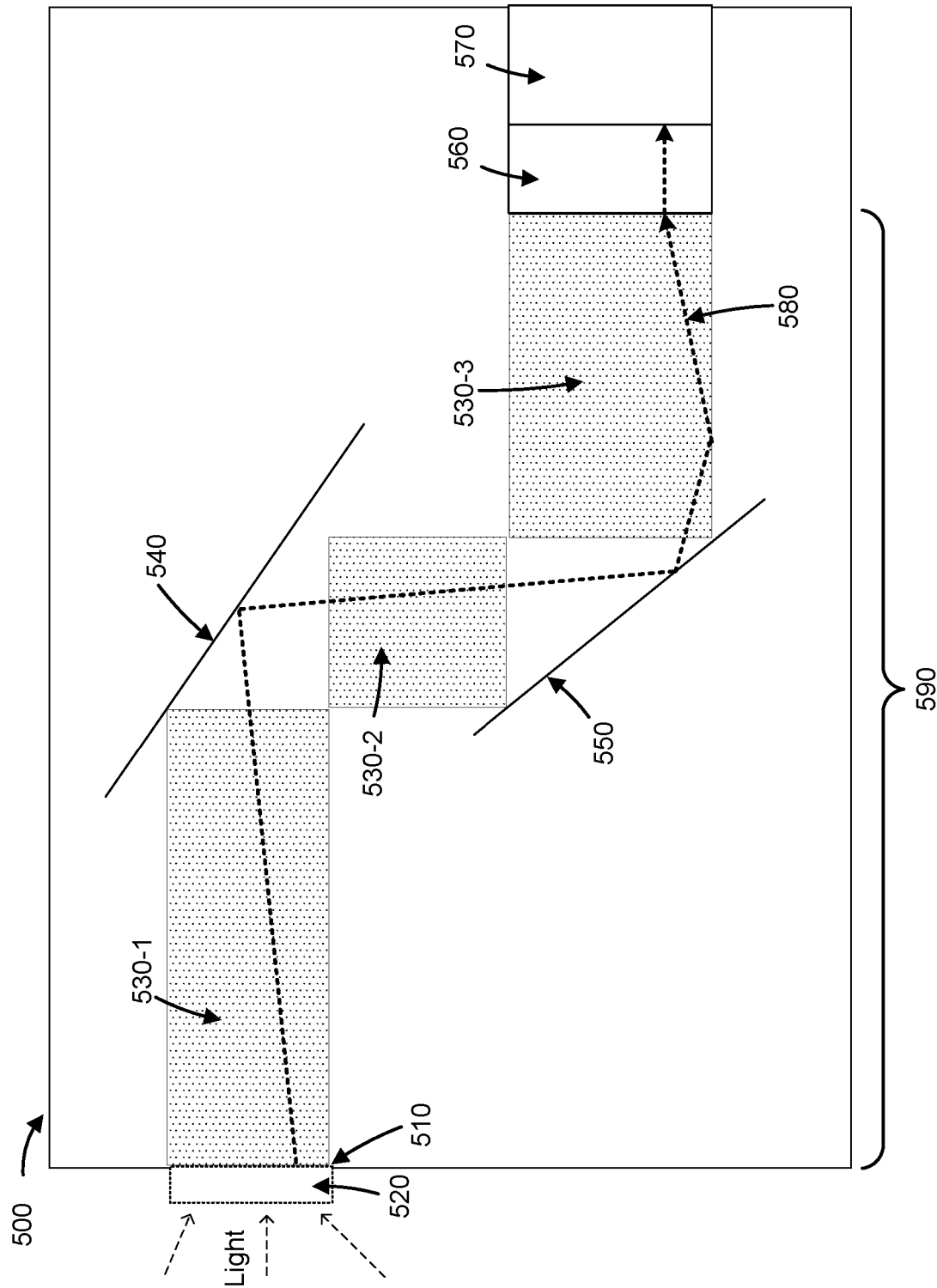
FIG. 5 is a diagram illustrating a side-view of an example optical device described herein.

FIG. 5 is a diagram illustrating a side-view of an example optical device 500 (also referred to as an optical system). The example optical device 500 may be configured to collect light to facilitate analysis of the light (e.g., to determine spectral information associated with the light). As shown in FIG. 5, example optical device 500 may include an aperture 510, a diffusive optical element 520, a plurality of optical conduits 530 (shown as optical conduits 530-1 through 530-3), a reflective optical element 540, a reflective optical element 550, an optical filter 560, and/or an optical sensor 570. The aperture 510, the diffusive optical element 520, the optical filter 560, and the optical sensor 570 may respectively be the same as, or similar to, the aperture 110, the diffusive optical element 120, the optical filter 150, and the optical sensor 160 described herein in relation to FIG. 1. Accordingly, the diffusive optical element 520 may diffuse light received by the aperture 510 to create diffused light, and the optical sensor 570 may be configured to capture spectral information associated with the diffused light that is directed to the input surface of the optical filter 560 by the plurality of optical conduits 530, the reflective optical element 540, and/or the reflective optical element 550.

The plurality of optical conduits 530 may each include a light guide, a light pipe, and/or any other type of optical structure to transmit light and may be configured in a similar manner as optical conduit 130 and/or optical conduit 440 described herein. In some implementations, the optical conduit 530-1 may be positioned within an internal region of the example optical device 500 (e.g., disposed between the aperture 510 and the reflective optical element 540) to receive the diffused light created by the diffusive optical element 520 and to transmit the diffused light to the reflective optical element 540. The optical conduit 530-2 may be positioned within an internal region of the example optical device 500 (e.g., disposed between the reflective optical element 540 and the reflective optical element 550) to receive the diffused light reflected by the reflective optical element 540 and to transmit the diffused light to the reflective optical element 550. The optical conduit 530-3 may be positioned within an internal region of the example optical device 500 (e.g., disposed between the reflective optical element 550 and the optical filter 560) to receive the diffused light reflected by the reflective optical element 550 and to transmit the diffused light to the optical filter 560.

The reflective optical element 540 may include an optical reflector and/or any other type of optical structure to reflect light. The reflective optical element 540 may be positioned within an internal region of the example optical device 500 to receive the diffused light from the optical conduit 530-1 and to reflect the diffused light to the optical conduit 530-2. In some implementations, the reflective optical element 540 may be configured to reflect one or more first ranges of wavelengths of the diffused light to the optical conduit 530-2. For example, the reflective optical element 540 may be partially transmissive and/or partially absorbing for wavelengths of the diffused light that are not within the one or more first ranges to prevent the reflective optical element 540 from reflecting diffused light not associated with the one or more first ranges to the optical conduit 530-2.

The reflective optical element 550 may include an optical reflector and/or any other type of optical structure to reflect light. The reflective optical element 550 may be positioned within an internal region of the example optical device 500 to receive the diffused light from the optical conduit 530-2 and to reflect the diffused light to the optical conduit 530-3. In some implementations, the reflective optical element 550 may be configured to reflect one or more second ranges of wavelengths of the diffused light (e.g., where the one or more second ranges of wavelengths of the diffused light are the same as or different from the one or more first ranges of wavelengths of the diffused light) to the optical conduit 530-3. For example, the reflective optical element 550 may be partially transmissive and/or partially absorbing for wavelengths of the diffused light that are not within the one or more second ranges to prevent the reflective optical element 550 from reflecting diffused light not associated with the one or more particular ranges to the optical conduit 530-3.

In some implementations, light (e.g., ambient light) may be diffused by the diffusive optical element 520 to create diffused light, which may enter the example optical device 500 via the aperture 510. As shown in FIG. 5, the plurality of optical conduits 530, the reflective optical element 540, and the reflective optical element 550 may direct a light beam of the diffused light to an input surface of the optical filter 560 via a folded optical path 580 that originates at an output surface of the diffusive optical element 520 and terminates at the input surface of the optical filter 560 and that traverses an internal region of the example optical device 500 and respective internal regions of the plurality of optical conduits 530. For example, the light beam may transmit from the diffusive optical element 520 to the optical conduit 530-1, which may transmit the light beam to the reflective optical element 540, which may reflect the light beam to the optical conduit 530-2, which may transmit the light beam to the reflective optical element 550, which may reflect the light beam to the optical conduit 530-3, which may transmit the light beam to the input surface of the optical filter 560.

In this way, the folded optical path 580 is long enough to allow the diffused light to disperse while transmitting through the internal region of the example optical device 500 and the respective internal regions of the plurality of optical conduits 530. This causes the diffused light to be distributed across the input surface of the optical filter 560 (e.g., causes the diffused light to cover at least a particular percentage of the input surface of the optical filter 560, such as 95%, 98%, or 99.5% of the input surface of the optical filter 560), which may allow the optical filter 560 to pass more of the diffused light to the optical sensor 570 than using conventional configurations that do not utilize a folded optical path. Further, in some implementations, a length of the folded optical path 580 is greater than a distance 590 between the aperture 510 and an input surface of the optical filter 560, which allows the optical device 500 to have a reduced thickness as compared to using conventional configurations that do not utilize a folded optical path. For example, the length of the folded optical path 580 may be approximately 10 mm and the distance 590 may be approximately 3-5 mm. This allows the optical device 500 to be incorporated into user devices, such as mobile phone devices, that require a small form factor (e.g., a thickness on the order of millimeters), which is not otherwise possible.

Moreover, the plurality of optical conduits 530, the reflective optical element 540, and the reflective optical element 550 may be configured to cause light beams of the diffused light to fall incident on the input surface of the optical filter 560 at angles that satisfy (e.g., that are less than or equal to) an incidence angle threshold. This causes the light beams to enter the optical filter 560 such that a channel of the optical filter 560 that receives an individual light beam (e.g., that is associated with a wavelength that the channel is configured to pass) passes the light beam to a corresponding sensor element of the optical sensor 570 (rather than a sensor element that does not correspond to the channel). This increases a likelihood that the optical sensor 570 determines accurate spectral information associated with the diffused light as compared to an optical sensor included in an optical device that utilizes a conventional configuration.

As indicated above, FIG. 5 is provided as an example. Other examples may differ from what is described with regard to FIG. 5.

Figure 6:
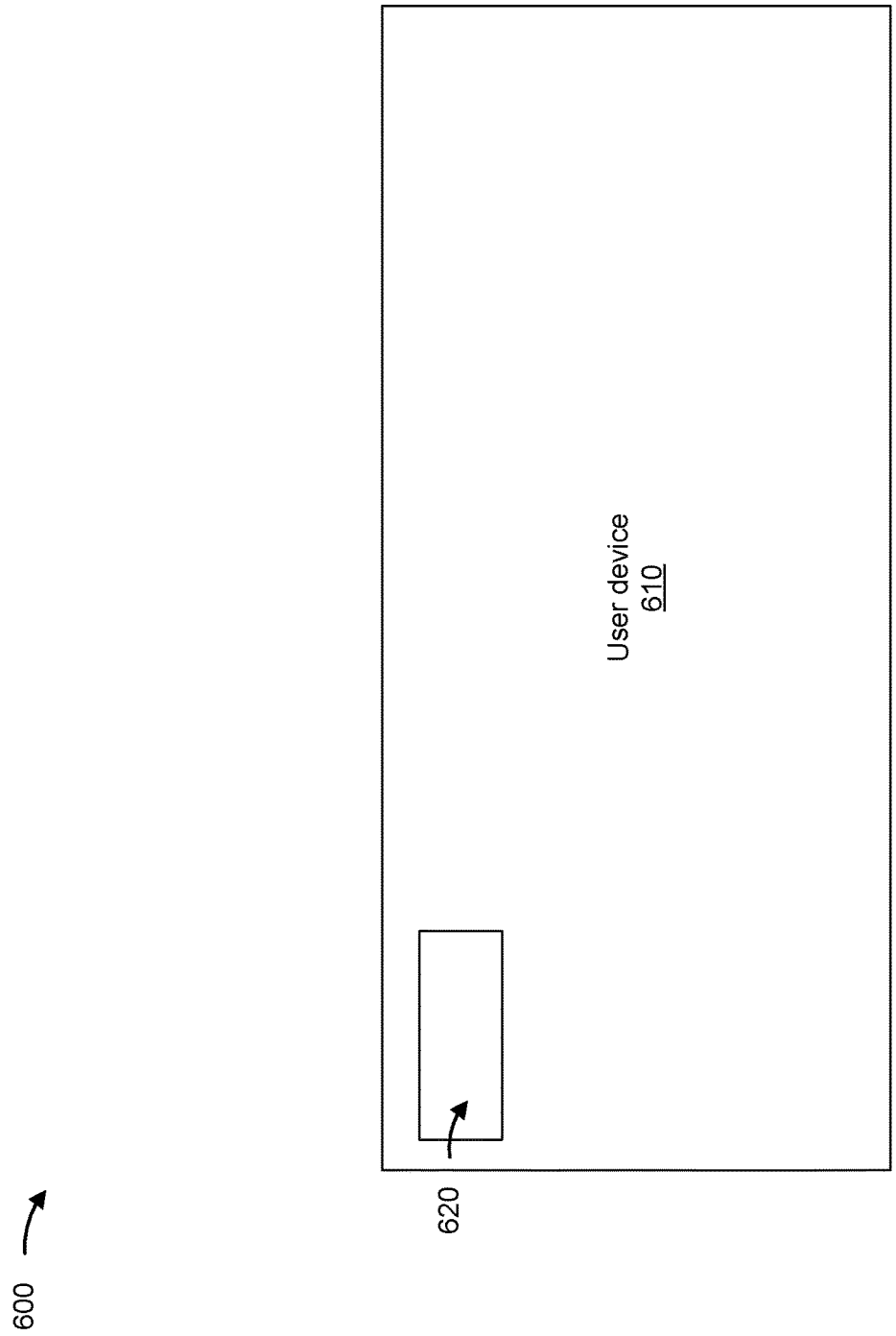
FIG. 6 is a diagram illustrating an example of a user device that includes an example optical device described herein.

FIG. 6 is a diagram illustrating an example 600 of a user device 610 that may include an optical device 620. User device 610 may include, for example, a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), a spectrometer, or a similar type of device. The optical device 620 may include example optical device 100, example optical device 200, example optical device 300, example optical device 400, example optical device 500, or a similar optical device that utilizes a folded optical path. The optical device 620 may be included in an optical package of the user device 610. By reducing the size of the optical device 620, the optical device 620 may be implemented in user devices 610, or the optical device 620 may have a smaller footprint in a user device 610 than an optical device associated with a linear optical path.

As indicated above, FIG. 6 is provided as an example. Other examples may differ from what is described with regard to FIG. 6.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
   an aperture;
   a diffusive optical element positioned on an exterior surface of the optical device and disposed over the aperture;
   an optical filter; and
   an optical conduit disposed between the aperture and the optical filter,
      wherein a width of a first end of the optical conduit corresponds to a width of the diffusive optical element,
      wherein a width of a second end of the optical conduit corresponds to a width of the optical filter, and
      wherein a folded optical path traverses an internal region of the optical conduit.

2. The optical device of claim 1, wherein a length of the folded optical path is two or more times greater than a distance between the aperture and an input surface of the optical filter.

3. The optical device of claim 1, wherein a length of the folded optical path is configured to cause diffused light to be distributed across more than 50% of an input surface of the optical filter.

4. The optical device of claim 1, wherein the aperture includes a lens or a window configured to receive light into the optical device.

5. The optical device of claim 1, wherein the aperture includes an aperture stop or one or more other optical elements configured to one or more of:
   control an amount of light that enters the optical device, or
   control a range of incidence angles of the light.

6. The optical device of claim 1, wherein the diffusive optical element is configured to cause light to transmit through the diffusive optical element and diffuse the light before the light enters the optical device via the aperture.

7. The optical device of claim 1,
   wherein the first end of the optical conduit is disposed on the diffusive optical element; and
   wherein the second end of the optical conduit is disposed on the optical filter.

8. The optical device of claim 1,
   wherein the diffusive optical element is configured to diffuse light, and
   wherein the optical conduit includes one or more of:
      one or more first portions configured to one or more of reflect, refract, diffract, or transmit the diffused light to cause the diffused light to transmit to the optical filter, or
      one or more second portions configured to further diffuse the diffused light after receiving the diffused light from the diffusive optical element.

9. The optical device of claim 1, further comprising:
   an optical sensor that includes a spectral sensor or a multi-spectral sensor,
      wherein the optical filter includes a spectral filter or a multispectral filter configured to pass one or more wavelengths of diffused light for sensing by the optical sensor, and
      wherein the optical sensor is configured to capture spectral information associated with the diffused light.

10. The optical device of claim 1, further comprising:
    an optical sensor configured to capture imaging information that includes one or more of hyper-spectral imaging information or multispectral imaging information.

11. The optical device of claim 1, wherein a length of the folded optical path is configured to cause diffused light to be distributed across more than 95% of an input surface of the optical filter.

12. The optical device of claim 1,
    wherein a length of the folded optical path is approximately 10 millimeters (mm), and
    wherein a distance between the aperture and an input surface of the optical filter is 3-5 mm.

13. The optical device of claim 1, wherein the optical conduit is configured to cause light beams of diffused light to fall incident on an input surface of the optical filter at angles that are less than or equal to an incidence angle threshold that is based on a channel, of the optical filter, that receives an individual light beam, of the light beams, passing the individual light beam to a corresponding sensor element of an optical sensor.

14. An optical device, comprising:
    an aperture;
    a diffusive optical element positioned on an interior surface of the optical device;
    an optical filter; and
    an optical conduit disposed between the aperture and the optical filter,
       wherein a width of a first end of the optical conduit corresponds to a width of the diffusive optical element,
       wherein a width of a second end of the optical conduit corresponds to a width of the optical filter, and
       wherein a folded optical path traverses an internal region of the optical conduit.

15. The optical device of claim 14, wherein the diffusive optical element is configured to diffuse light that enters the optical device via the aperture.

16. The optical device of claim 14, wherein a length of the folded optical path is two or more times greater than a distance between the aperture and an input surface of the optical filter.

17. The optical device of claim 14, wherein a length of the folded optical path is configured to cause diffused light to be distributed across more than 50% of an input surface of the optical filter.

18. An optical device, comprising:
    an aperture;
    an optical filter; and
    an optical conduit disposed between the aperture and the optical filter,
       wherein a width of a first end of the optical conduit corresponds to a width of the aperture,
       wherein a width of a second end of the optical conduit corresponds to a width of the optical filter, and
       wherein a folded optical path traverses an internal region of the optical conduit.

19. The optical device of claim 18, wherein the optical conduit is configured to:
    diffuse light received by the aperture; and
    transmit the diffused light to the optical filter.

20. The optical device of claim 18, wherein the optical device does not include a diffusive optical element.

* * * * *